(12) United States Patent
Suenaga et al.

(10) Patent No.: US 8,637,204 B2
(45) Date of Patent: Jan. 28, 2014

(54) FUEL CELL AND FUEL CELL STACK

(75) Inventors: Toshihiko Suenaga, Wako (JP);
Narutoshi Sugita, Wako (JP); Takayuki Ogawa, Wako (JP); Keisuke Andou, Wako (JP); Masajiro Inoue, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 55 days.

(21) Appl. No.: 13/326,979

(22) Filed: Dec. 15, 2011

(65) Prior Publication Data

US 2012/0088183 A1 Apr. 12, 2012

Related U.S. Application Data

(62) Division of application No. 11/326,020, filed on Jan. 5, 2006, now Pat. No. 8,097,379, which is a division of application No. 10/058,657, filed on Jan. 28, 2002, now Pat. No. 7,014,939.

(30) Foreign Application Priority Data

Jan. 30, 2001 (JP) ................................ 2001-022047
Jan. 11, 2002 (JP) ................................ 2002-005333

(51) Int. Cl.
 *H01M 8/24* (2006.01)
 *H01M 2/08* (2006.01)
(52) U.S. Cl.
 USPC ........................... 429/463; 429/460; 429/469
(58) Field of Classification Search
 USPC ................. 429/460, 463, 469, 508
 See application file for complete search history.

(56) References Cited

U.S. PATENT DOCUMENTS

| | | | |
|---|---|---|---|
| 4,414,294 | A | 11/1983 | Guthrie |
| 4,748,092 | A | 5/1988 | Hekal |
| 5,424,144 | A | 6/1995 | Woods, Jr. |
| 5,616,431 | A | 4/1997 | Kusunoki et al. |
| 5,789,094 | A | 8/1998 | Kusunoki et al. |
| 6,020,083 | A | 2/2000 | Breault et al. |
| 6,338,492 | B1 | 1/2002 | Schilling et al. |
| 6,440,597 | B1 | 8/2002 | Mizuno |
| 6,677,072 | B2 | 1/2004 | Suenaga et al. |
| 2002/0122970 | A1 | 9/2002 | Inoue et al. |

FOREIGN PATENT DOCUMENTS

| | | |
|---|---|---|
| DE | 19821767 C2 | 11/1999 |
| DE | 19960516 A1 | 7/2000 |
| JP | 61-279069 | 12/1986 |
| JP | H06/196177 | 7/1994 |
| JP | 7-249417 | 9/1995 |

(Continued)

OTHER PUBLICATIONS

Canadian Office Action for Application No. 2,564,237, dated Jan. 31, 2007.

(Continued)

*Primary Examiner* — Tracy Dove
(74) *Attorney, Agent, or Firm* — Nelson Mullins Riley & Scarborough LLP; Antony A. Laurentano

(57) ABSTRACT

In a solid polymer electrolyte membrane [film] type fuel cell of the invention, where a pair of electrodes are provided on opposite sides of a solid polymer electrolyte membrane [film], and the outside thereof is clamped by a pair of separators, and nonconductive picture frame-shaped members 61 are arranged at the outer edge portions of the separators, for allowing increase and decrease of a space between separators, while sealing a gap between the separators.

9 Claims, 12 Drawing Sheets

(56) References Cited

FOREIGN PATENT DOCUMENTS

| | | |
|---|---|---|
| JP | 07312223 | 11/1995 |
| JP | 09237633 | 9/1997 |
| JP | H10/055813 | 2/1998 |
| JP | H10/074530 | 3/1998 |
| JP | 2000182639 | 6/2000 |
| JP | 2002/042837 | 2/2002 |
| JP | 2002/124275 | 4/2002 |
| WO | 97/24778 A1 | 7/1997 |
| WO | 99/04446 A1 | 1/1999 |

OTHER PUBLICATIONS

German Office Action for Application No. 10262309.0, pp. 1-16, dated Feb. 8, 2012.

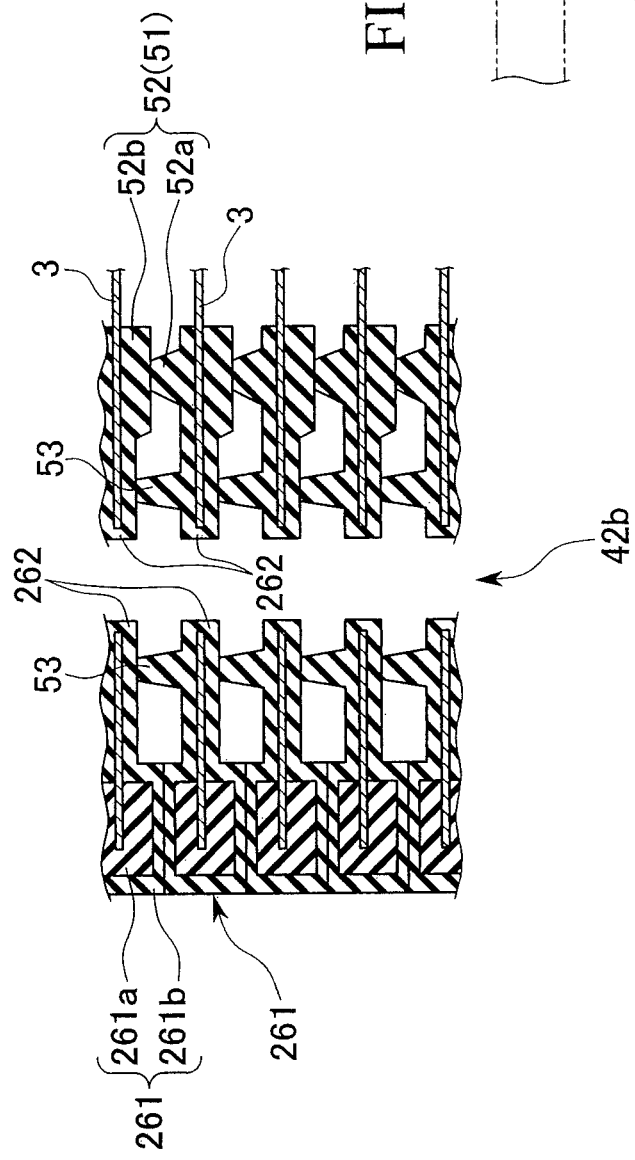
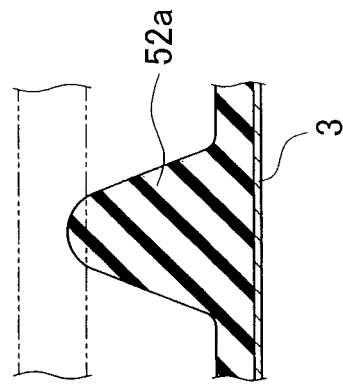
FIG. 18A
FIG. 18B

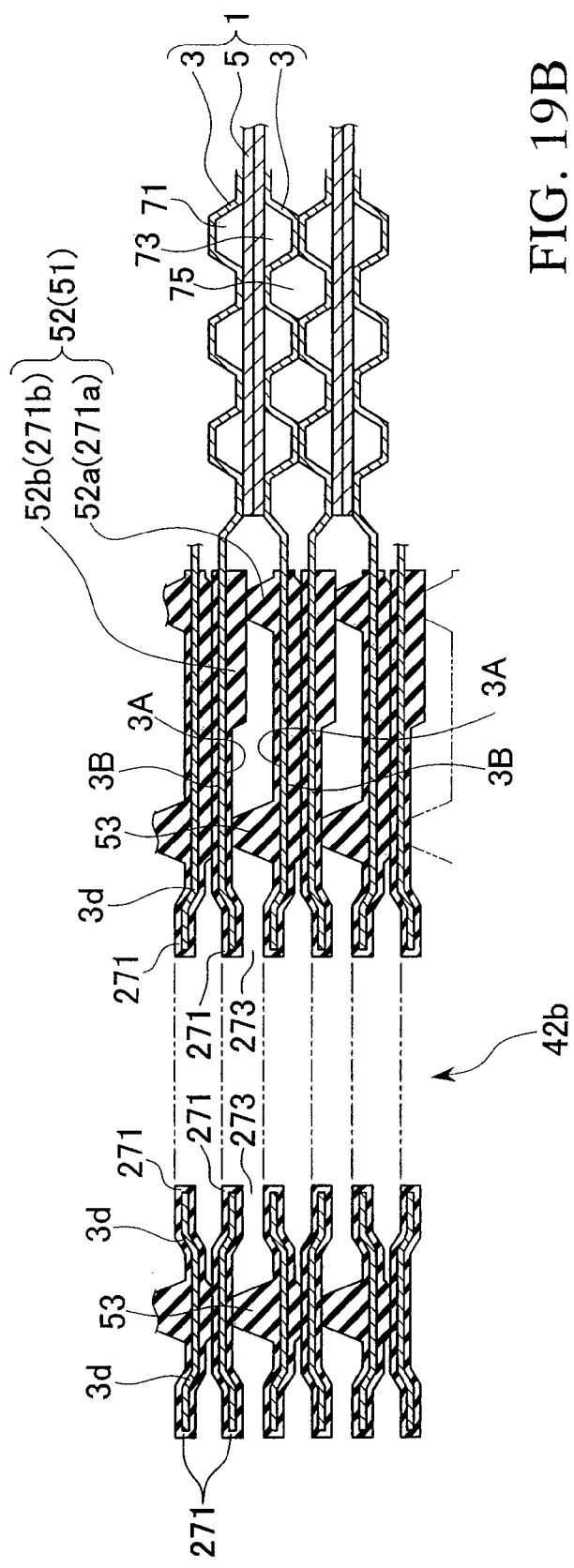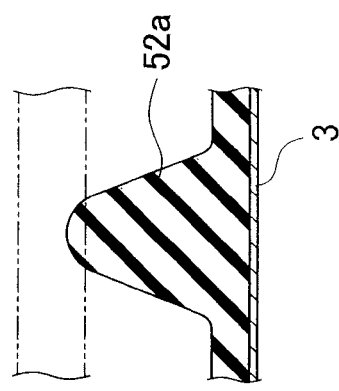

FUEL CELL AND FUEL CELL STACK

RELATED APPLICATIONS

This application is a divisional application of U.S. patent application Ser. No. 11/326,020 filed Jan. 5, 2006 (allowed for issuance) which is a divisional application of U.S. patent application Ser. No. 10/058,657 filed Jan. 28, 2002 issued as U.S. Pat. No. 7,014,939 on Mar. 21, 2006, which claims priority to Japanese Patent Application No. 2001-022047 filed Jan. 30, 2001 and Japanese Patent Application No. 2002-005333 filed Jan. 11, 2002 in Japan. The contents of the aforementioned applications are hereby incorporated by reference.

BACKGROUND OF THE INVENTION

1. Field of the Invention

The present invention relates to a solid polymer electrolyte membrane type fuel cell, and a fuel cell stack constituted by stacking a plurality of said fuel cell units, and more specifically relates to a technique effective in absorbing increase and decrease in the stacking direction of separators.

2. Description of the Related Art

Fuel cells include a solid polymer electrolyte membrane type fuel cell constituted by providing a pair of electrodes on opposite sides of the solid polymer electrolyte membrane and sandwiching the outside thereof by a pair of separators.

In this fuel cell, a channel for a fuel gas (for example hydrogen) is provided on the whole surface of a separator provided facing one electrode, a channel for an oxidant gas (for example air including oxygen) is provided on the whole surface of a separator provided facing the other electrode, and a channel for a cooling medium is provided on either one of the surface of separators opposite to a surface facing the electrode.

When the fuel gas is supplied to the reaction surface of one electrode, hydrogen is ionized, and moves to the other electrode via the solid polymer electrolyte membrane. Electrons generated during the reaction process are taken out to an external circuit, and are used as direct-current electric energy.

Since the oxidant gas is supplied to the other electrode, the hydrogen ions, the electrons and the oxygen react with each other to thereby generate water.

The surface on the opposite side of the electrode reaction plane of the separator is cooled by the cooling medium flowing between the separators.

Since these reactant gas and cooling medium should flow in respectively independent channels, a sealing technique, which separates each channel, is important.

The portions to be sealed include; the peripheries of communication holes formed penetrating through the separator so as to distribute and supply the reactant gas and the cooling medium to each fuel cell unit in the fuel cell stack, the outer peripheries of membrane electrode assembly formed of the solid polymer electrolyte membrane and a pair of electrodes arranged on opposite sides thereof, the outer peripheries of a coolant passage plane of the separator, and the outer peripheries of front and back faces of the separator. As the sealing material, a elastic and adequately resilient material, for example, an organic rubber, is adopted.

In the case where the fuel cells are stacked in a plurality of numbers to construct the fuel cell stack, and this fuel cell stack is mounted in a vehicle, there may be a case where drops of water splash and the fuel cell becomes wet, depending on the installed position, or dust enters into the gap between separators.

However, the sealing material can prevent such water and dust from entering into the reactant gas channel or into the cooling medium channel.

At the time of stacking the separators, if there is a difference in thickness between the membrane electrode assembly, or if there is bending or distortion in the separator (particularly, in a thin separator made of metal), or if the compressive load applied from the opposite ends of the fuel cell stack is non-uniform, the separators are not stacked parallel with each other, and inclination or warp occurs. Hence, the compression amount of each sealing material becomes unequal, and as a result, sealability deteriorates in sealing material having a small amount of compression.

At the time of stacking the separators, it is also difficult to stack these separators accurately without shifting their relative positions along the electrode reaction plane.

As measures against the above problems, there can be considered a method in which foreign substance is prevented from entering into the gap between the separators, and the separators are stacked parallel with each other, by providing, for example, a picture frame-shaped member made of resin, at the outer edge of the separator.

Techniques similar to this are disclosed in, for example, Japanese Unexamined Patent Application, First Publication Nos. Hei 10-74530, Hei 7-249417 and Sho 61-279069.

However, if the sealing material or the membrane electrode assembly shrinks in the stacking direction of the separators due to deterioration with the lapse of time, or the fuel cell expands or contracts due to the influence of heat or the like, the following problems will occur.

For example, when the protruding height of the sealing material from the separator becomes lower than the protruding height of the picture frame-shaped member, shrinkage of the space between separators is restricted by the picture frame-shaped member. Hence, a gap may be caused between the separator and the sealing material or the membrane electrode assembly, thereby causing a decrease in the power generation performance, and consequently causing a situation where power generation is not possible.

On the other hand, if the space between separators expands due to the influence of heat or the like, a sealing material such as a rubber will be resiliently restored and extend in the stacking direction of the separators, and hence, this sealing material can follow the expansion of the space between separators without separating from the separator, to some extent. A picture frame-shaped member made of resin or the like, however, since this does not expand in the stacking direction of the separators, this cannot accommodate the expansion of the space between separators.

Therefore, a gap occurs between the picture frame-shaped members, and foreign substance may enter there.

Moreover, it is desired to prevent a liquid connection by the cooling medium, which causes an electric current flowing through the cooling medium, and it is also necessary to prevent adjacent separators in the reactant gas channel from being electrically short circuited.

Particularly, in the case of a fuel cell using thin metal separators, since the space between separators is small, it is particularly desired to specially take measures to prevent electrical short circuited from occurring between adjacent separators, taking into account that foreign substance such as dust and carbon particles become mixed in the reactant gas.

SUMMARY OF THE INVENTION

In order solve above-described problems, the fuel cell of the present invention is constituted as follows.

According to the first aspect of the present invention, a fuel cell comprising a pair of separators which clamp outsides of a pair of electrodes (for example, electrodes 9 in the embodiment) provided on both sides of a solid polymer electrolyte membrane [film] (for example, the solid polymer electrolyte membrane [film] 7 in the embodiment), wherein the fuel cell further comprises a nonconductive picture frame-shaped member (for example, picture frame-shaped members 61, 81, 91, 101, 121, 131, 141, 251 and 261 in the embodiments) which allows increasing and decreasing of a space between separators, while sealing the gap between separators, is provided at the outer edge of said separator.

According to this construction, with respect to a movement increasing the space between separators, a gap is not produced between the separator and the picture frame-shaped member, and furthermore, with respect to a movement narrowing the space between separators, this movement is not restricted by the picture frame-shaped member.

According to the second aspect of the present invention, in a fuel cell according to the first aspect, said picture frame-shaped members (for example, picture frame-shaped members 101, 111, 121, 131 in the embodiments) are constituted so as to be able to slide relative to each other.

According to the above construction, the width of the space between separators can be mechanically adjusted by relative sliding movement of the picture frame-shaped members.

According to the third aspect of the present invention, in the fuel cell according to the first aspect, said separator is made of a metal, and said picture frame-shaped member (for example, picture frame-shaped members 61, 81, 91, 261 in the embodiments) is formed of a hard material (for example, main body portions 61a, 81a, 91a, and 261a in the embodiment) and a elastic material (increase and decrease absorbing portions 61b, 81b, 91b, and 261b in the embodiment).

According to the above construction, since the elastic material is capable of elastically contracting in the stacking direction of the fuel cell, separators are not limited in access to each other.

The expansion of spaces between separators in proximity can be accommodated by the elastic material due to resilient contraction thereof in the stacking direction.

According to the fourth aspect of the present invention, in the fuel cell according to the first aspect, said picture frame-shaped member comprises a separator positioning device (for example, a combination of a concave portion 123 and a convex portion 125, a combination of an end surface 131A and an end surface 131B, and a combination of a grooved portion with a triangular cross-section 143 and a protruded portion 145 with a triangular cross-section 145 in the embodiments).

According to the above construction, it is possible to prevent relative misalignment between separators that may occur when the separators are stacked.

According to the fifth aspect of the present invention, in the fuel cell according to the first aspect, the outer peripheries of the separators are covered with the picture frame-shaped members (for example, picture frame-shaped members 61, 81, 91, 101, 111, 121, 131, 141, 251, and 261 in the embodiments).

According to the above structure, it is possible to prevent adjacent separators from being short circuited.

According to the sixth aspect of the present invention, in the fuel cell according to the fifth aspect, an reaction surface peripheral sealing member (for example, the peripheral sealing member 52 in the embodiment) is provided for covering the reaction surfaces of separators and the outside portion of the reaction surface peripheral sealing member is totally covered by an insulating outer edge member (for example, an increase and decrease absorbing portion 261b in the embodiment) is provided around a communication hole formed in the separator.

According to the above structure, since the exposed metal surface outside of the reaction surface peripheral sealing member of the separators is totally covered by the insulating outer surface member, the corrosion resistance of the separators is improved and the electrical short circuiting between separators can be effectively prevented.

According to the seventh aspect of the present invention, in the fuel cell according to the sixth aspect, both outside surfaces of the reaction surface peripheral sealing member (for example, the peripheral sealing member 52 in the embodiment) are totally covered by an insulating outer peripheral member (for example, increase and decrease absorbing member 261b), which is integrally constructed with the reaction surface peripheral sealing member.

According to the above construction, since the exposed metal surfaces at the outer area of both surfaces at the peripheral area of the reaction surface peripheral sealing member exposed outside of the reaction outer surface sealing member are totally covered by the insulating outer surface member, it is possible for separators to be more resistant to corrosion, and to short circuiting between adjacent separators.

According to the eighth aspect of the present invention, in the fuel cell according to the seventh aspect, one of the reaction surface peripheral sealing member of adjacent separators is formed in a flat shape, and the other reaction surface peripheral sealing member which faces to the flat reaction surface peripheral sealing member is formed so as to protrude.

According to the above construction, since outer surfaces of the reaction surface peripheral sealing members are formed in combination of flat and protruded areas, so that the relative misalignment of the flat surface of an reaction surface peripheral sealing member can be absorbed by the protruded surface of the other reaction surface peripheral sealing member.

According to the ninth aspect of the present invention, in the fuel cell stack according to the eighth aspect, which is constituted by a plurality of stacked [stackd] fuel cell units, the picture frame-shaped members allow expansion or contraction of spaces between separators, while sealing the space between respective separators.

According to the above construction, for not only a single fuel cell but also for a plurality of adjacent fuel cells, it is possible to prohibit generating a space between a separator and the picture frame-shape member, and contraction of the space between separators is not prohibited by the picture frame-shape member.

According to the tenth aspect of the present invention, in the solid polymer electrolyte membrane [film]-type fuel cell, comprising a pair of electrodes formed on both surfaces of the solid polymer electrolyte membrane [film] and a pair of metal foil separators covering both surfaces of the membrane-type fuel cell, insulating members (for example, insulating members 201, 211, 221, 231, 241, and 271 in the embodiment) are provided around communication holes (for example, an inlet side oxidizing agent communication hole 41a, an outlet side oxidizing agent gas communication hole 41b, an inlet side fuel gas communication hole 43b, an inlet side fuel gas communication hole 42b, an inlet side cooling medium communication hole 43a, and an outlet side communication hole 43b in the embodiment) formed in the separators.

According to the above construction, it is possible to prevent liquid connection by the cooling medium and to prevent short circuiting between adjacent separators in the reactant gas channel.

According the eleventh aspect of the present invention, in the fuel cell according to the tenth aspect, respective spaces (for example, the space 203 in the embodiment) are provided between each two insulating members of the adjacent separators (for example, insulating member 201 in the embodiment) in the stacking direction of the separators.

According to the above construction, the increase and decrease of the separator spaces can be absorbed by the gap in the stacking direction of separators.

According to the twelfth aspect of the present invention, in the fuel cell according to the tenth aspect, each insulating member (for example, the insulating member 201 in the embodiment) of respective adjacent separators is formed such that adjacent separators are capable of relatively sliding to allow increase and decrease of the space between separators while the insulating members are sealing the spaces between separators.

According to the above construction, increase and decrease of the separator spaces can be mechanically absorbed by relative sliding of respective insulating members.

According to the thirteenth aspect of the present invention, in the fuel cell according to the tenth aspect, the insulating members (for example, the insulating member 231 and 241 in the embodiments) are made of elastic material.

According to the above construction, contraction of the separator spaces are not regulated because the soft material is capable of resiliently contracting in the stacking direction of the fuel cells, and expansion of the separator space can be followed by the resilient restoration of the elastic material due to resilient elongation of the elastic material.

According to the fourteenth aspect of the present invention, in the fuel cell according to the tenth aspect, the inner peripheral surfaces of the communication holes are covered by the insulating member (for example, the insulating members 201, 211, 221, 231, 241, and 271 in the embodiments).

According to the above construction, it is possible to prevent short circuiting between inner peripheral end faces of the communication holes in the adjacent separators.

According to the fifteenth aspect of the present invention, in the fuel cell according to the tenth aspect, one of the insulating members of one of the adjacent separators (for example, a flat portion 271b of the insulating member in the embodiments) is formed in a flat shape, and the insulating member (for example, a protruded portion 271a of the insulating member in the embodiments) of one of insulating members of another separator facing to the former flat insulating member is formed so as to protrude.

According to the above construction, provision of a combination of the insulating members of a separator into flat and protruded areas makes it possible to absorb the relative misalignment of the protruded insulating member with respect to the flat insulating member.

According to the sixteenth aspect of the present invention, in the fuel cell according to the fifteenth aspect, provided with a reaction surface peripheral sealing member (for example, the peripheral sealing material 52), one of the reaction surface peripheral sealing members of adjacent separators (for example, the flat portion of the peripheral sealing material 52b in the embodiments) is formed in a flat shape, and the other one of the reaction surface peripheral sealing members of the opposing adjacent separators is formed so as to protrude.

According to the above construction, since the reaction surface peripheral sealing members are formed in a combination of flat and protruded areas, the relative misalignment of the protruded reaction surface peripheral sealing member corresponding to the flat outer reaction surface member cab be absorbed.

According to the seventeenth aspect of the present invention, in the fuel cell according to the sixteenth aspect, the outside portion of the reaction surface peripheral sealing members (the outer peripheral sealing material 52 in the embodiments) is totally covered by the insulating member (for example, the insulating member 271 in the embodiment).

According to the above construction, since the exposed metal portion of the separators at the outside portion of the reaction surface peripheral sealing member are totally covered by the insulators, it is possible to improve the corrosion resistance of the separators and it is possible to prevent adjacent separators from being electrically short circuited.

According to the eighteenth aspect of the present invention, in the fuel cell according to the seventeenth aspect, the reaction surface peripheral sealing member (for example, the peripheral sealing member 52 in the embodiments) and the insulating member (for example, the insulating member 271 in the embodiment) are integrally constituted.

According the above construction, it is possible to form the reaction surface peripheral sealing member and the insulating member can be integrally formed therewith.

According to the nineteenth aspect of the present invention, in the fuel cell according to the sixteenth aspect, both outside surfaces of the reaction surface peripheral sealing member (for example, the outer surface sealing member 52 in the embodiments) are covered by the insulating outer peripheral member (for example, the insulating member 271 in the embodiments) constituted integrally with the reaction surface peripheral sealing member.

According to the above construction, since both surfaces of the exposed metal surfaces at the outside portion of the reaction surface peripheral sealing member are covered by the insulating members, the corrosion resistance of separators is improved and the electrical short circuiting between adjacent separators can be avoided.

BRIEF DESCRIPTION OF THE DRAWINGS

FIG. 18A is a diagram showing main portions of the other modification example of the first embodiment, and 18B shows an enlarged diagram of the protruded portion 52a of the peripheral sealing material.

FIG. 19A is a diagram showing the main portion of the fifth embodiment, and 19B is an enlarged diagram of the protruded portion of the peripheral sealing material.

DETAILED DESCRIPTION OF THE INVENTION

Hereinafter, embodiments of the present invention will be described with reference to the attached drawings.

Figure 1:
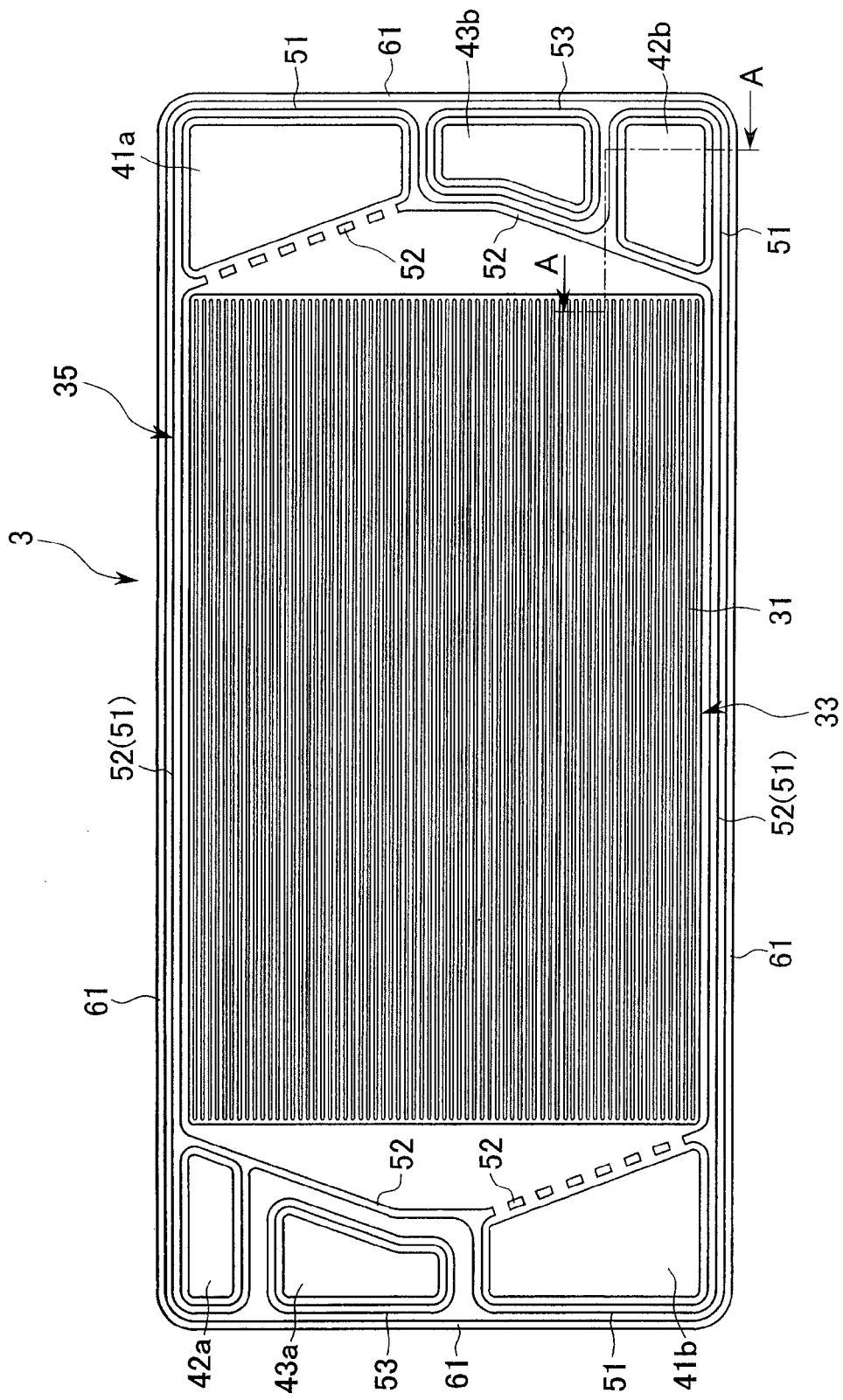
FIG. 1 is a plan view showing a separator of a solid polymer electrolyte membrane [film] type fuel cell according to a first embodiment of the present invention.

FIG. 1 is a plan view showing a separator 3 constituting a solid polymer electrolyte membrane [film] type fuel cell 1 according to a first embodiment.

Figure 2:
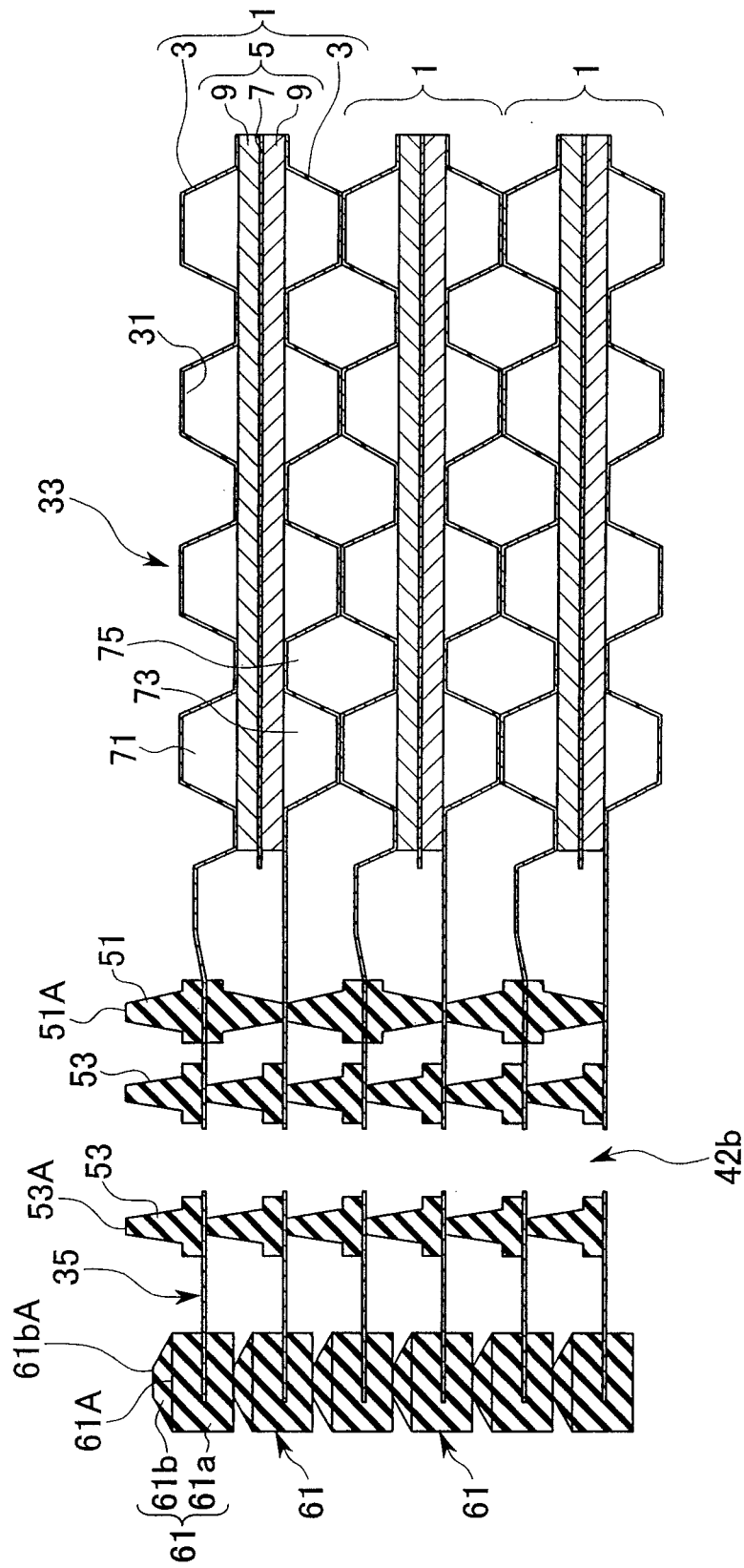
FIG. 2 is a cross-section obtained by sectioning a fuel cell stack formed by stacking a plurality of solid polymer electrolyte membrane [film] fuel cells comprising the separators in FIG. 1, at a position corresponding to line A-A in FIG. 1.

The fuel cell 1 is constructed by alternately stacking the separators 3 and an membrane electrode assembly 5 formed by sandwiching [clamping] a solid polymer electrolyte membrane [film] 7 by a pair of electrodes 9, as shown in FIG. 2, and a fuel cell stack is formed by stacking a plurality of unit fuel cells 1.

As shown in FIG. 1, the separator 3 comprises a corrugated sheet portion 33 in which a plurality of concave portions 31 having a certain height are formed at a certain pitch by press molding a stainless steel plate material having a plate thickness of from 0.2 to 0.5 mm, and a plane portion 35 for mutually contacting edge portions located outside of each corrugated sheet portion 33 through a sealing material.

This separator 3 is provided with an inlet side oxidant gas communication hole 41a for passing an oxidant gas therethrough and an inlet side fuel gas communication hole 42a for passing a fuel gas therethrough, on the upper side at opposite ends in the horizontal direction located at the outer peripheral portion in that plane. The separator 3 is further provided, at the center at opposite ends in the horizontal direction, with an inlet side cooling medium communication hole 43a for passing a cooling medium therethrough, and an outlet side cooling medium communication hole 43b for passing the used cooling medium therethrough.

There are also provided in the separator 3 an outlet side oxidant gas communication hole 41b for passing the oxidant gas therethrough and an outlet side fuel gas communication hole 42b for passing the fuel gas therethrough, on the lower side at opposite ends in the horizontal direction located at the outer peripheral portion in that plane, so that these are at diagonally opposite positions with respect to the inlet side oxidant gas communication hole 41a and the inlet side fuel gas communication hole 42a, respectively.

In the separator 3 on a cathode side shown in FIG. 1, the oxidant gas flows in from the inlet side oxidant gas communication hole 41a, and then flows into each concave portion 31 in the corrugated sheet portion 33, to be directed from one short edge side of the separator towards the other short edge side thereof, and flows out from the outlet side oxidant gas communication hole 41b.

Similarly, in the separator 3 on an anode side (the plan view is not shown), the fuel gas flows in from the inlet side fuel gas communication hole 42a, and then flows into each concave portion 31 in the corrugated sheet portion 33, to be directed from one short edge side of the separator towards the other short edge side thereof, and flows out from the outlet side fuel gas communication hole 42b.

The above described inlet side oxidant gas communication hole 41a, inlet side fuel gas communication hole 42a, inlet side cooling medium communication hole 43a, outlet side oxidant gas communication hole 41b, outlet side fuel gas communication hole 42b and outlet side cooling medium communication hole 43b respectively correspond to communication holes according to the present invention.

On the front face and the back face of the separator 3, there are arranged a first sealing material 51 surrounding the outside of the corrugated sheet portion 33, the inlet side oxidant gas communication hole 41a, the outlet side oxidant gas communication hole 41b, the inlet side fuel gas communication hole 42a, and the outlet side fuel gas communication hole 42b, and a second sealing material 53 surrounding the outside of the inlet side cooling medium communication hole 43a and the outlet side cooling medium communication hole 43b.

Here, the corrugated portion 33 is a portion corresponding to the reaction surface of the separator, and, among sealing materials, the outer peripheral sealing material 52 surrounding the portion corresponding to the outer periphery of the corrugated portion 33 corresponds to the reaction surface peripheral sealing member.

Note that the sealing material is removed in order to inflow or outflow the oxidizing gas at portions adjacent to the inlet side oxidant gas communication hole 41a and the outlet side oxidant gas communication hole 41b. Similarly, in the anode side of the separator (not shown in the plan view), the sealing material is also removed at portions adjacent to the inlet side fuel gas communication hole 42a and the outlet side fuel gas communication hole 42b.

Moreover, a nonconductive picture frame-shaped member 61 covering the outer periphery and the outer end face of the whole periphery is arranged at the outer edge portion of the separator 3.

This picture frame-shaped member 61, as shown in FIG. 2, is constituted by a body portion 61a having a rectangular section comprising a hard resin material, such as polyamide or PTFE, and a increase and decrease absorbing portion 61b (hereinafter referred to as a flexible absorbing portion) having a trapezoidal section comprising a material softer than the body portion 61a and having resilience, for example, a foam material such as rubber.

A border plane 61A between the body portion 61a and the flexible absorbing portion 61b, and an upper end face 61bA of the flexible absorbing portion 61b are set at a lower position than upper end faces 51A and 53A of the first and second sealing materials 51 and 53, and the difference of elevation between the upper end face 61bA and the upper end faces 51A and 53A is set less than a compression margin of the first and second sealing materials 51 and 53.

The compression margin means a crushing margin at the time of crushing the first and second sealing materials 51 and 53 when stacking the separators, so that a predetermined seal surface pressure acts on the separator 3.

When a concave portion 31 in a separator 3 constituting one fuel cell 1 and an other concave portion 31 in a separator 3 constituting an other fuel cell 1 are put together sequentially, a space having a trapezoidal section shown in the figure formed between the concave portion 31 of the separator 3 and the electrode 9 becomes an oxidant gas channel 71 for circulating the oxidant gas and a fuel gas channel 73 for circulating the fuel gas. The space having a hexagonal section shown in the figure formed surrounded by the separators 3 becomes a cooling medium channel 75 for circulating the cooling medium.

At the time of stacking the separators, the first and second sealing materials 51 and 53 are crushed by the compression margin, so as to reliably seal the periphery of each of the communication holes 41a, 42a, 43a, 41b, 42b, and 43b with a predetermined seal surface pressure acting on the separator 3.

At this time, the flexible absorbing portion 61b of the picture frame-shaped member 61 arranged at the outer edge portion of each separator 3 is also pressed by the separator 3 and compressed by a predetermined dimension, more specifically, by a difference obtained by subtracting the height difference between the upper end face 61bA and the upper end faces 51A and 53A from the compression margin of the first and second sealing materials 51 and 53.

Therefore, even if the space between separators expands due to the influence of heat or the like, the flexible absorbing portion 61b of the picture frame-shaped member 61 is resiliently restored and extends in the stacking direction of the separators, and follows the body portion 61a of other picture frame-shaped members 61, which are apt to separate from the flexible absorbing portion 61b.

Hence, even if the space between separators is enlarged, the picture frame-shaped members 61 being in contact with each other are not separated. As a result, foreign substance can be effectively prevented from entering from outside, and the durability of the first and second sealing materials 51 and 53 is also improved.

Since the flexible absorbing portion 61b is resiliently contractible in the stacking direction of the separators, relative approach of the separators 3 is not restricted, so long as this is within a resiliently contractible range.

Therefore, even if the first and second sealing materials 51 and 53, or the membrane electrode assembly 5 deteriorates with the lapse of time and the height becomes low, the flexible absorbing portion 61b can contract in the stacking direction of the separators to thereby decrease the space between separators. As a result, the close contact state of these sealing materials 51, 53 and the membrane electrode assembly 3 [5] with the separator 3 can be maintained, preventing a decrease in the power generation performance and a situation that power generation is not possible Since the picture frame-shaped member 61 is formed of an insulating material, there is the effect that a short circuiting does not occur, even if the surface of the fuel cell stack becomes wet due to water or condensation, and the effect that a short circuiting does not occur due to a contact of adjacent separators. Furthermore, since the outer peripheral faces of the separator 3 is covered by the insulating material, it is also possible to prevent adjacent separators from being short circuited. Further, the picture frame-shaped member 61 arranged around the whole periphery of the outer edge portion of the separator 3, particularly the body portion 61a consisting of a hard resin material, functions as a rib for reinforcement. Hence, deformation of a thin metal separator 3 can be effectively prevented.

In the case where a thick separator which does not require the reinforcing function is used instead of this thin metal separator 3, the whole picture frame-shaped member 61 may be constituted of a elastic material.

Figure 3A:
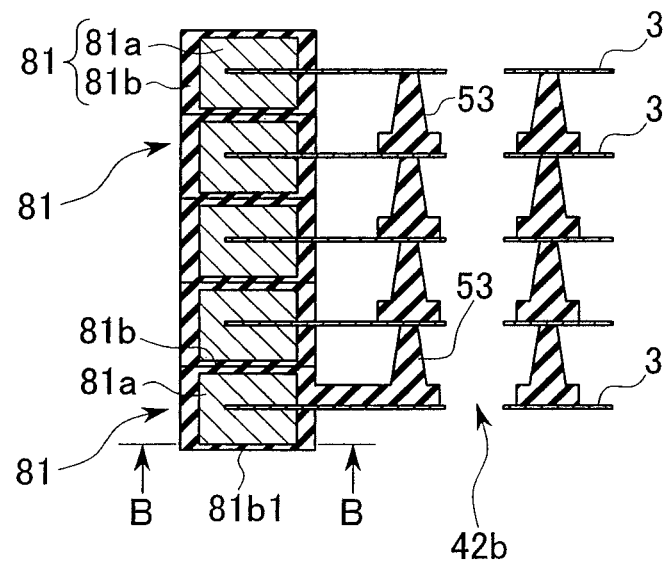
FIG. 3A is a cross-section showing the main parts of a modification example of the first embodiment.
Figure 3B:
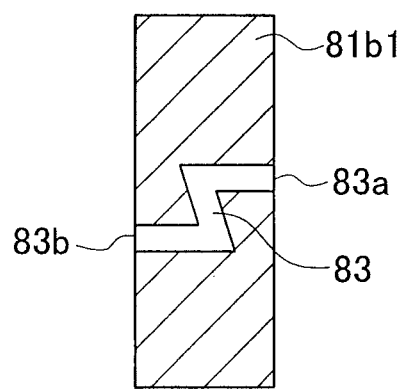
FIG. 3B is a cross-section along line B-B in FIG. 3A.

FIG. 3A is a cross-section showing a modification example of the first embodiment, and FIG. 3B is a cross-section along a line B-B in FIG. 3A.

In the description for this modification example, the same constituents as those of FIG. 2 are denoted by the same reference symbols as in FIG. 2, and description thereof is omitted.

A picture frame-shaped member 81 in this modification example is constructed such that a flexible absorbing portion 81b covers a body portion 81a, and a drain hole 83 is formed in at least one of the flexible absorbing portions 81b1 extending parallel with the separator 3.

The body portion 81a and the flexible absorbing portion 81b are constituted of, for example, the same material as that of the body portion 61a and the flexible absorbing portion 61b in FIG. 1.

The drain hole 83 is for discharging excess gas or produced dew condensation water between separators 3, and is formed curved in an approximate Z-shape as shown in FIG. 3B, so as to prevent foreign substance from entering from outside, by shifting the position of openings 83a and 83b in the direction of the separator width (in the vertical direction in FIG. 3B).

Also with this modification example, since the picture frame-shaped member 81 comprises the flexible absorbing portion 81b, foreign substance can be prevented from entering from outside at the time of enlargement of the space between separators, and a deterioration of sealability with deterioration of the sealing material with the lapse of time can be prevented, as in the first embodiment.

The picture frame-shaped member 81 may be connected to a second sealing material 53, as with one arranged on the separator 3 located at the lowest stage in FIG. 3A.

FIG. 18A is a diagram showing the other modification example of the first embodiment, and 18B shows a enlarged diagram of the protruded portion 52a of the outer peripheral sealing material.

In the explanation of this modification example of the first embodiment, the same constituents as those of FIG. 2 are denoted by the reference symbols and their explanations are omitted.

In the picture frame-shaped member 261 according to this modification example, the flexible absorbing portion 261b (the insulating outer peripheral member) covers the main body portion 261a, and the both surfaces of the outside portion of the outer peripheral sealing material 52 of the separator 3, that is, the front and rear surfaces of the outside portion is covered by the flexible absorbing portion 261b. Since the outer peripheral end surface of the separator 3 and the inner edge surface of respective communication holes 41a, 42a, 43a, 41b, 42b, and 43b are covered by the picture frame-shaped member 261 and the flexible absorbing portion 261b, and the inner end surface of respective communication holes 41a, 42a, 43a, 41b, 42b, and 43b are covered by the flexible absorbing portion 261b.

These main body portion 261a and the flexible absorbing portion 261b are constituted by the same material as those of the main body portion 61a and the flexible absorbing portion 61b shown in FIG. 2.

In addition, the flexible absorbing portion 261b is integrally constituted with the first sealing material including the peripheral sealing material 52, and also integrally constituted with the second sealing material 53.

The peripheral sealing material flat portion 52b of one of adjacent separators 3 is formed in a flat shape, and the peripheral sealing material 52a is formed in a protruded shape. Furthermore, the top portion of the protruded peripheral sealing material is configured to form an R-shape in cross-section.

According to the construction of this modification example, the flexible absorbing portion 261b is capable of elastically contracting in the stacking direction of the separators, it is possible, as described in the first embodiment, to prevent contamination when the separator space is expanded, and also to prevent sealing property of the sealing material due to passage of time.

Sine the outer end surface of the separator 3 and the inner end surfaces of respective communication holes 41a, 42a, 43a, 41b, 42b and 43b are covered by the picture frame-shaped member, it is possible to prevent the electrical short circuiting at the outer end surface of the separator 3 and the inner end surfaces of the communication holes 41a, 42a, 43a, 41b, 41b, and 43b.

In addition, since the exposed metal surface of the separator 3 at the outside portion of the peripheral sealing material 52 is totally covered by the flexible absorbing portion 261b, it is possible to prevent adjacent separators to be electrically short circuited while improving the corrosion resistance.

Furthermore, since the flexible absorbing portion 261b is integrally constructed with the first sealing material 51 as well as the second sealing material 53, it is possible to form these materials at the same time, which results in reducing the manufacturing cost of these components.

In addition, since the peripheral sealing materials 52 are formed in a combination of a flat shape and a protruded shape, misalignment of the protruded portion 52a of the peripheral sealing material 52a with respect to the flat portion 52b of the peripheral sealing material 52a can be absorbed, which makes it unnecessary to aligning operation of the sealing positions, and which results in increasing the productivity.

At the time of stacking separators, the R-shape cross section of the top portion of the protruded portion of the peripheral sealing material of one separator is pressed on the flat portion of the sealing material of another separator, the sealing is improved.

Figure 4:
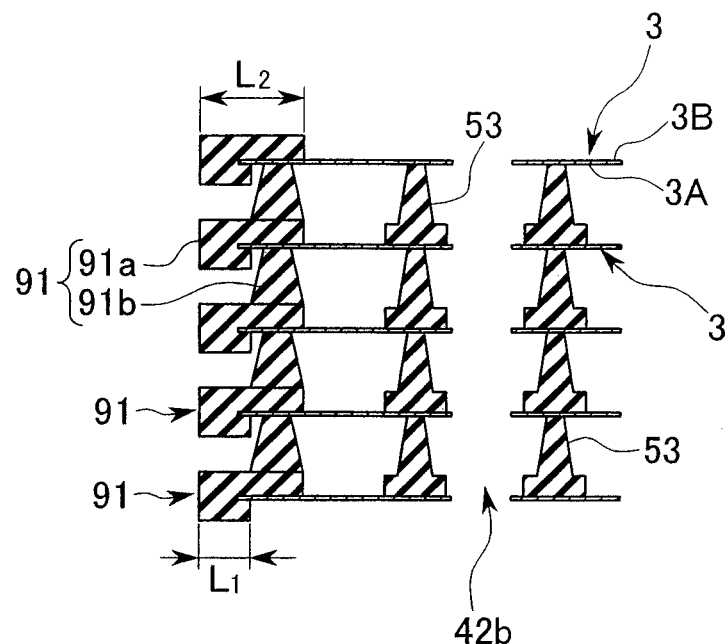
FIG. 4 is a cross-section showing the main parts of another modification example in the first embodiment.

FIG. 4 is a cross-section showing another modification example of the first embodiment.

In the description of this modification example, the same constituents as those of FIG. 2 are denoted by the same reference symbols as in FIG. 2, and description thereof is omitted.

The picture frame-shaped member 91 according to this modification example is constructed such that a covering margin L1 of a body portion 91a which covers the reaction plane 3A side of the separator 3 is set to substantially the half of a covering margin L2 which covers the cooling plane 3B side, and a flexible absorbing portion 91b is integrated with only the inside edge portion on the cooling plane side of the body portion 91a.

The body portion 91a and the flexible absorbing portion 91b are constituted of, for example, the same material as that of the body portion 61a and the flexible absorbing portion 61b in FIG. 1.

Also with this modification example, since the picture frame-shaped member 91 comprises the flexible absorbing portion 91b, foreign substance can be prevented from entering from outside at the time of enlargement of the space between separators, and a deterioration of sealing capability with deterioration of the sealing material with the lapse of time can be prevented, as in the first embodiment.

Further, the flexible absorbing portion 91b of the picture frame-shaped member 91 according to this embodiment has a higher protrusion height from the separator 3 than that of the flexible absorbing portion 61b in the first embodiment. As a result, an even greater increase and decrease margin can be acquired, and hence this has excellent following ability at the time of enlargement of the space between separators.

A fuel cell according to a second embodiment of the present invention will now be described.

Figure 5:
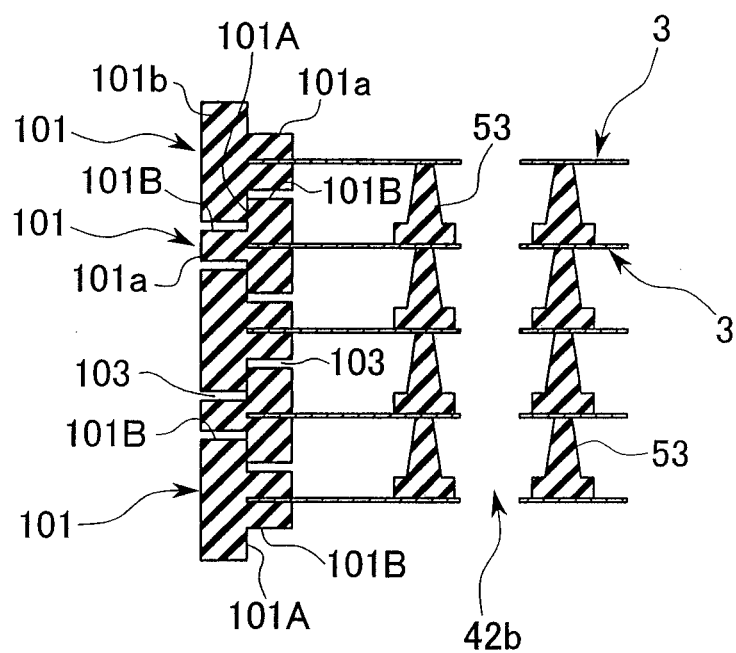
FIG. 5 is a cross-section showing the main parts of a second embodiment of the present invention.

FIG. 5 is a cross-section showing the main parts of the fuel cell.

The same constituents as those of FIG. 1 are denoted by the same reference symbols as in FIG. 1, and description thereof is omitted.

A picture frame-shaped member 101 according to this embodiment has a different basic construction from that of the first embodiment and the modification examples thereof which use elastic deformation to absorb increase and decrease, in that increase and decrease in the stacking direction of the separators is absorbed mechanically.

This picture frame-shaped member 101 has a convex shape in section with a protruding portion 101a protruding from a base portion 101b, and the protruding portion 101a is arranged so as to face the inside of the fuel cell stack (the right side in FIG. 5) and the outside thereof (the left side in FIG. 5) alternately along the stacking direction of the separators.

The adjacent two picture frame-shaped members 101 are normally not brought into contact with each other on a plane 101B parallel with the separator 3, but are brought into contact with each other on a plane 101A parallel with the stacking direction of the separators.

That is to say, a space between separators is provided by the protruding height of first and second sealing materials 51 and 53 (in FIG. 5, only the second sealing material 53 is shown) from the separator 3. This protruding height is set larger than the sum of the protruding height of the protruding portion 101a and the protruding height of the base portion 101b from the separator 3.

As a result, a gap 103 is formed between the base portion 101b of one of the two adjacent picture frame-shaped members 101 and the protruding portion 101a of the other picture frame-shaped member 101.

According to this construction, the movement of expanding or contracting the space between separators is absorbed only by enlarging or narrowing the gap 103 between the picture frame-shaped members 101, while the plane 101A of one of the two adjacent picture frame-shaped members 101 and the plane 101A of the other picture frame-shaped member 101 slides relative to each other, without separating from each other.

Therefore, as in the first embodiment, foreign substance can be prevented from entering from outside at the time of enlargement of the space between separators, and a deterioration of sealability with deterioration of the sealing material with the lapse of time can be prevented.

In this embodiment, if taking notice of the adjacent two picture frame-shaped members 101, since the planes 101B parallel with the separator 3 do not come in contact with each other, any load along the stacking direction of the separators does not occur between these two picture frame-shaped members 101.

Therefore, the compression load acting on the first and second sealing materials 51 and 53 does not disperse into the picture frame-shaped member 101, thereby enabling effective prevention of a reduction of a seal surface pressure.

Figure 6:
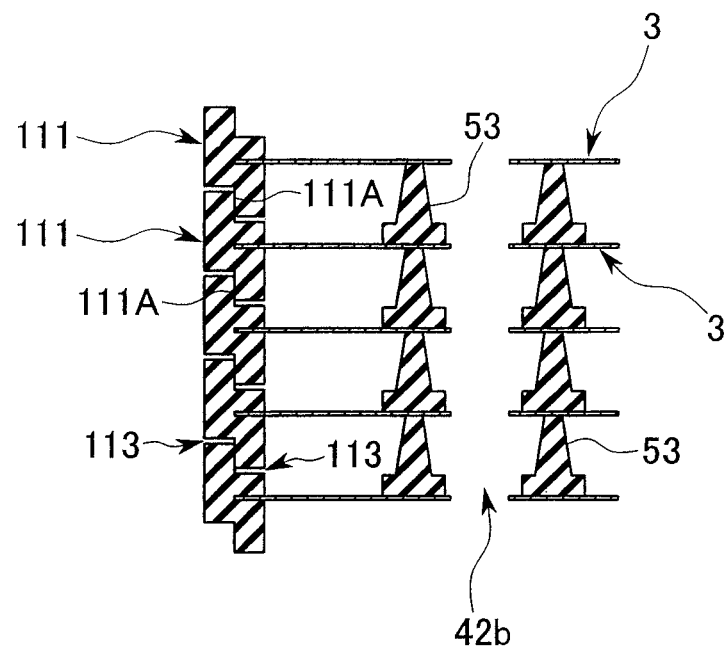
FIG. 6 is a cross-section showing the main parts of a modification example of the second embodiment.

FIG. 6 is a cross-section showing a modification example of the second embodiment.

In the description of this modification example below, the same constituents as those of FIG. 2 are denoted by the same reference symbols as in FIG. 2, and description thereof is omitted.

According to a picture frame-shaped member 111 of this modification example, as in the construction in FIG. 5, a surface 111A of one of the adjacent picture frame-shaped members 111 and a surface 111A of the other picture frame-shaped members 111 slide relative to each other without separating from each other, to thereby enlarge or narrow a gap 113 between picture frame-shaped members 111. As a result, as in the second embodiment, intrusion of foreign substance at the time of enlargement of the space between separators, a deterioration of sealability with deterioration of the sealing material with the lapse of time, and a decrease in the seal surface pressure can be prevented.

In this embodiment, from the point that picture frame-shaped members 111 having the same cross-section are arranged at the outer edge portion of each separator 3 in the same form, the construction is different in to that of the second embodiment in which picture frame-shaped members 101 having the same cross-section are arranged at the outer edge portion of each separator 3 in a different form, that is, with the protruding direction of the protruding portions 101a alternately changed in the stacking direction of the separators.

Hence, in the case where the picture frame-shaped member 111 is integrally formed at the outer edge portion of the separator 3 by injection molding, molding is possible with only one kind of mold, thereby enabling a reduction in production cost.

Figure 7:
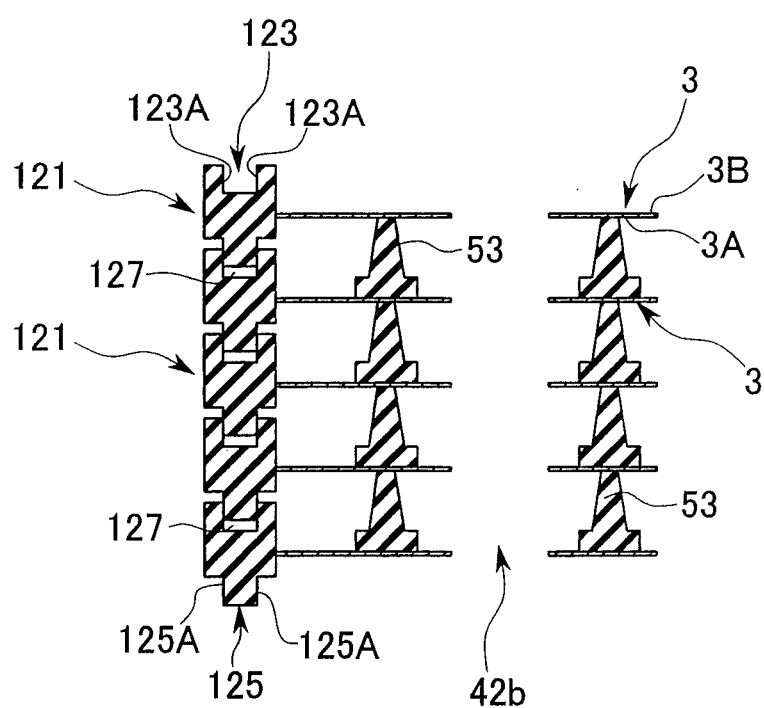
FIG. 7 is a cross-section showing the main parts of another modification example in the second embodiment.

FIG. 7 is a cross-section showing another modification example of the second embodiment.

In the description of this modification example below, the same constituents as those of FIG. 2 are denoted by the same reference symbols as in FIG. 2, and description thereof is omitted.

In a picture frame-shaped member 121 according to this modification example, a concave portion 123 is formed in the end face on the cooling plane 3B side of the separator 3, and a convex portion 125 having a shape capable of being fitted to the concave portion 123 is protrudingly formed on the end face on the reaction plane 3A side of the separator 3.

According to this construction, increase and decrease can be absorbed by enlarging or narrowing the gap between the picture frame-shaped members 121, while the inner face 123A of the concave portion and the external face 125B of the convex portion slide relative to each other parallel with the stacking direction of the separators, without separating from each other. Further, since the picture frame-shaped members 121 having the same cross-section are arranged at the outer edge portion of each separator 3 in the same form, intrusion of foreign substance at the time of enlargement of the space between separators, a deterioration of sealability with deterioration of the sealing material with the lapse of time, and a decrease in the seal surface pressure can be prevented, and a reduction in production cost can be realized, as with the modification example of FIG. 6.

Moreover, according to the picture frame-shaped member 121 in this modification example, if the convex portion 125 of the picture frame-shaped member 121 arranged in one of the adjacent separators 3 is fitted into the concave portion 123 of the picture frame-shaped member 121 arranged in the other separator 3, the relative position of the separators 3 can be automatically adjusted, thereby enabling an improvement of workability at the time of assembly and maintenance.

That is to say, in this modification example, a separator positioning device according to the present invention is constituted by the concave portion 123 and the convex portion 125.

A fuel cell according to a third embodiment of the present invention will now be described.

Figure 8:
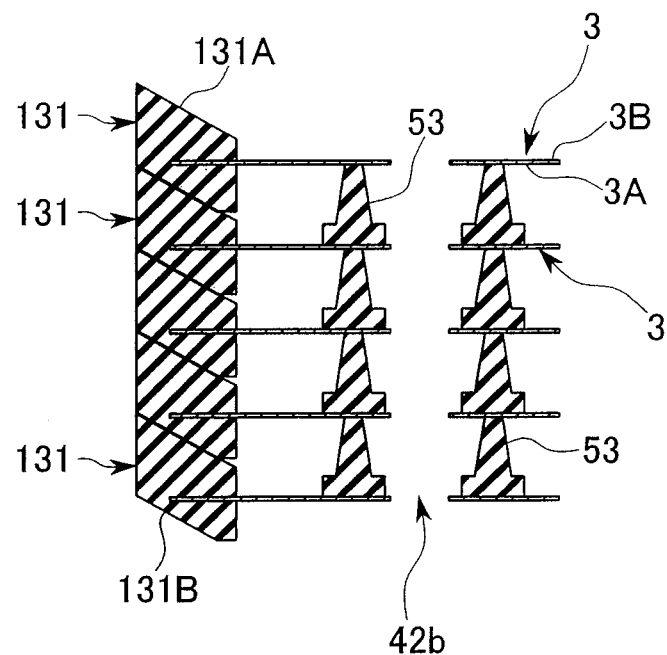
FIG. 8 is a cross-section showing the main parts of a third embodiment of the present invention.

FIG. 8 is a cross-section showing the main parts of the fuel cell.

The same constituents as those of FIG. 2 are denoted by the same reference symbols as in FIG. 2, and description thereof is omitted.

A picture frame-shaped member 131 according to this embodiment has a bowl-like inclined face with an end face 131A on the cooling plane 3B side of the separator 3 and an end face 131B on the reaction plane 3A side of the separator 3 inclined with respect to the cooling plane 3B and the reaction plane 3A, with the inner side down (in the cross-section showing the main part in FIG. 8, the right side down).

In this embodiment, the separator positioning device is constituted by these end faces 131A and 131B.

According to this construction, increase and decrease of the space between separators can be absorbed by relative sliding movement of the end face 131A of one of the adjacent picture frame-shaped members 131 and the end face 131B of the other picture frame-shaped member 131, without separating from each other. Moreover, since picture frame-shaped members 131 with the same cross-section and with the same shape are disposed around the outer periphery of the separator 3, the relative position of the separators 3 is automatically adjusted. Since the picture frame-shaped members 131 having the same cross-section are arranged at the outer edge portion of each separator 3 in the same form, intrusion of foreign substance at the time of enlargement of the space between separators, a deterioration of sealability with deterioration of the sealing material with the lapse of time, and a decrease in the seal surface pressure can be prevented, and a reduction in production cost and an improvement of workability at the time of assembly and maintenance can be realized, as in the modification example of FIG. 6.

A fuel cell according to a fourth embodiment of the present invention will now be described.

Figure 9:
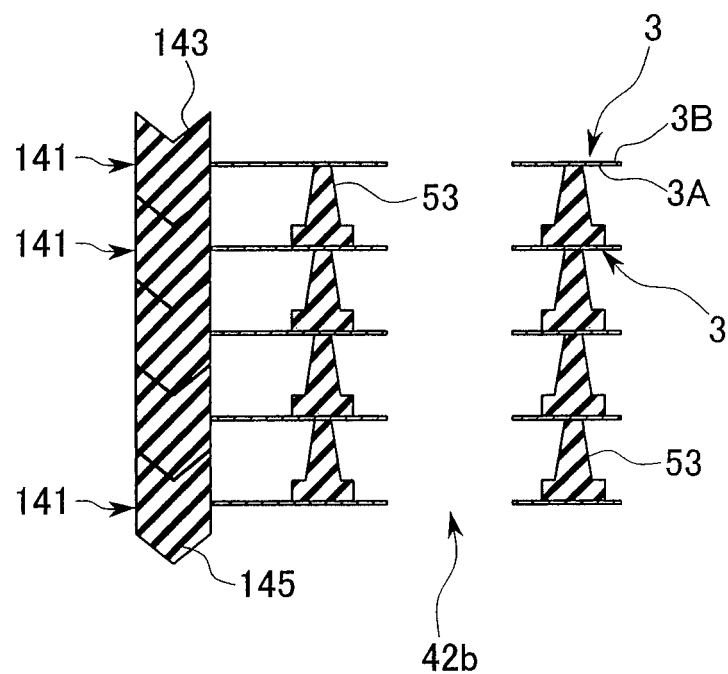
FIG. 9 is a cross-section showing the main parts of a modification example of the third embodiment.

FIG. 9 is a cross-section showing the main parts of the fuel cell.

The same constituents as those of FIG. 2 are denoted by the same reference symbols as in FIG. 2, and description thereof is omitted.

A picture frame-shaped member 141 according to this embodiment is formed of the same elastic material as that of, for example, the flexible absorbing member 61b in FIG. 1, in the form of feathers of an arrow in cross-section.

In this picture frame-shaped member 141, the separator positioning device is constituted by a triangular groove 143 in section formed on the end face of the cooling plane 3B side and a triangular protruding portion 145 in section formed on the end face of the reaction plane 3A side.

According to this construction, the increase and decrease of the space between separators is absorbed by elastic increase and decrease of the picture frame-shaped member 141. Also, if the triangular protruding portion 145 of the picture frame-shaped member 141 arranged on one of the adjacent separators 3 in section is fitted into the triangular groove 143 in section of the other picture frame-shaped member 141 arranged in the other separator 3, the relative position of the separators 3 can be automatically adjusted, and further, the picture frame-shaped members having the same cross-section are arranged at the outer edge portion of each separator 3 in the same form. As a result, intrusion of foreign substance at the time of enlargement of the space between separators, a deterioration of sealability with deterioration of the sealing material with the lapse of time, and a decrease in the seal surface pressure can be prevented, and a reduction in production cost and an improvement of workability at the time of assembly and maintenance can be realized, as in the construction of FIG. 8.

Figure 10:
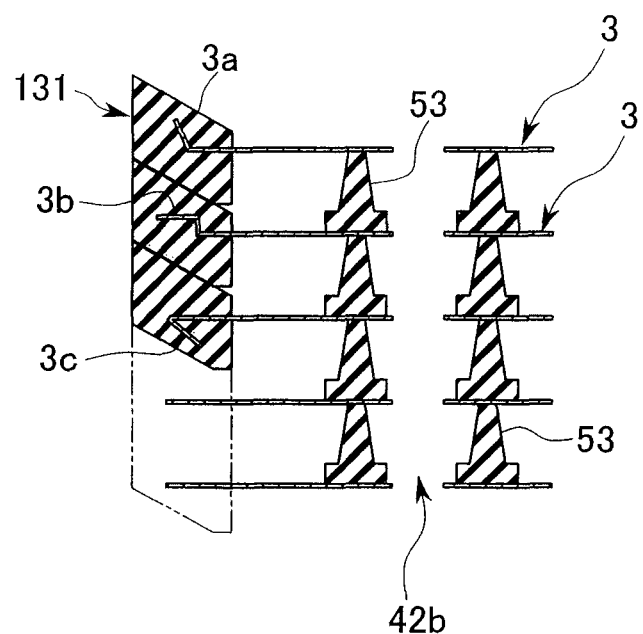
FIG. 10 is a cross-section showing the main parts of another modification example in the third embodiment.

In the above described constructions in which the picture frame-shaped members 61, 81, 91, 101, 111, 121, 131, and 141 are arranged at the outer edge portion of the separator, the outer edge of the separator 3 may be folded to form bent portions 3a, 3b and 3c, as shown in FIG. 10.

According to this construction, the bent portions 3a, 3b and 3c function as a reinforcement rib and a member of preventing disconnection of the picture frame-shaped members 61, 81, 91, 101, 111, 121, 131, and 141. As a result, deformation of the thin metal separator 3 and disconnection of the picture frame-shaped member 61, 81, 91, 101, 111, 121, 131, and 141 can be effectively prevented.

A fuel cell according to a fifth embodiment of the present invention will now be described.

Figure 11:
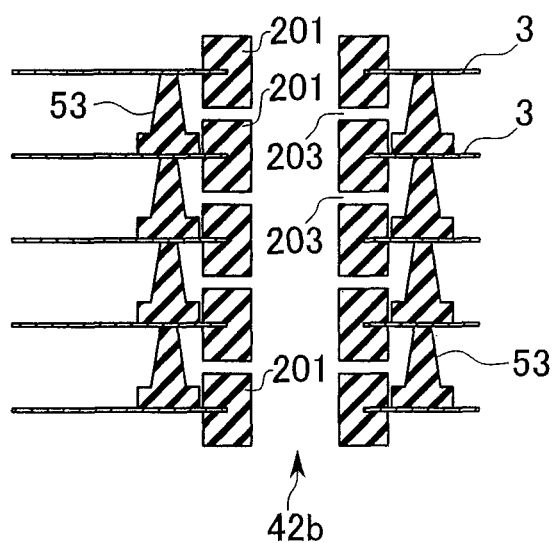
FIG. 11 is a cross-section showing the main parts of a fourth embodiment of the present invention.

FIG. 11 is a cross-section showing the main parts of the fuel cell.

The same constituents as those of FIG. 2 are denoted by the same reference symbols as in FIG. 2, and description thereof is omitted.

In this fuel cell, an annular insulating material 201 comprising a resin, rubber or the like, which cover the inner peripheral surfaces and the inner peripheral end surfaces, is arranged around the inlet side oxidant gas communication hole 41a, the inlet side fuel gas communication hole 42a, the inlet side cooling medium communication hole 43a, the outlet side oxidant gas communication hole 41b, the outlet side fuel gas communication hole 42b and the outlet side cooling medium communication hole 43b, formed in the separator 3.

In FIG. 11, only the outlet side fuel gas communication hole 42b is shown.

According to this construction, a liquid connection by the cooling medium and an electrical short circuiting between adjacent separators in the reactant gas channel can be prevented.

Particularly, since a fuel cell according to the present embodiment uses metal and thin separators, the space between the separators are small, and hence this has a disadvantageous structure in preventing an electrical short circuiting between separators. Therefore, the effect according to this construction is substantial.

Moreover, at the periphery of the communication hole in this thin metal separator 3, the insulating member 201 functions as a reinforcement rib, and hence the deformation thereof can also be effectively prevented.

Furthermore, since the protruding height of the insulating member from the front and back faces of the separator is set such that the insulating member 201 arranged on one of the adjacent two separators 3 does not come in contact with the insulating member 201 on the other separator 3, that is, a gap 203 is formed between the insulating members 201, increase and decrease of the space between separators can be absorbed by enlarging or narrowing this gap 203.

Therefore, intrusion of foreign substance at the time of enlargement of the space between separators, a deterioration of sealability with deterioration of the sealing material with the lapse of time, and a decrease in the seal surface pressure can be prevented.

Moreover, insulating members 201 having the same cross-section are arranged around the communication holes of each separator 3 in the same form. Therefore, when the insulating member 201 is integrally formed with the separator 3 by injection molding, molding is possible with only one kind of mold, thereby enabling a reduction in production cost.

Figure 12:
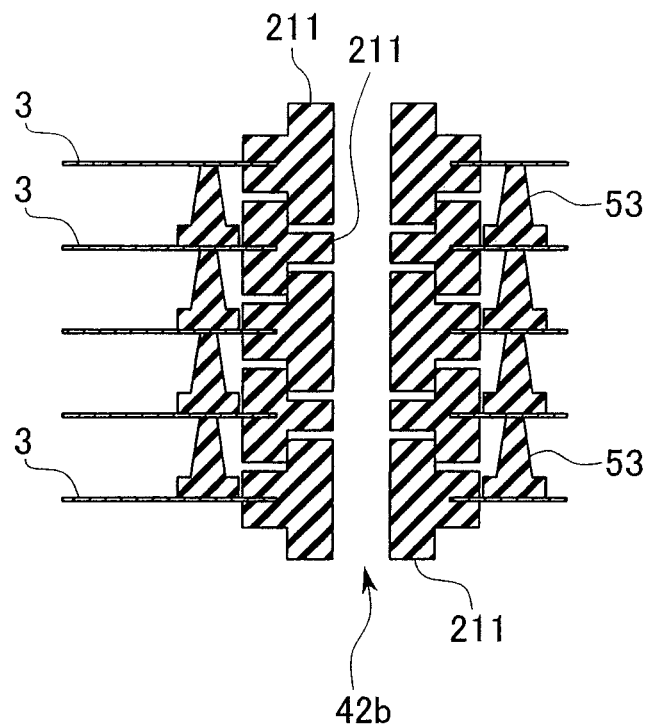
FIG. 12 is a cross-section showing the main parts of a modification example of the fourth embodiment.
Figure 13:
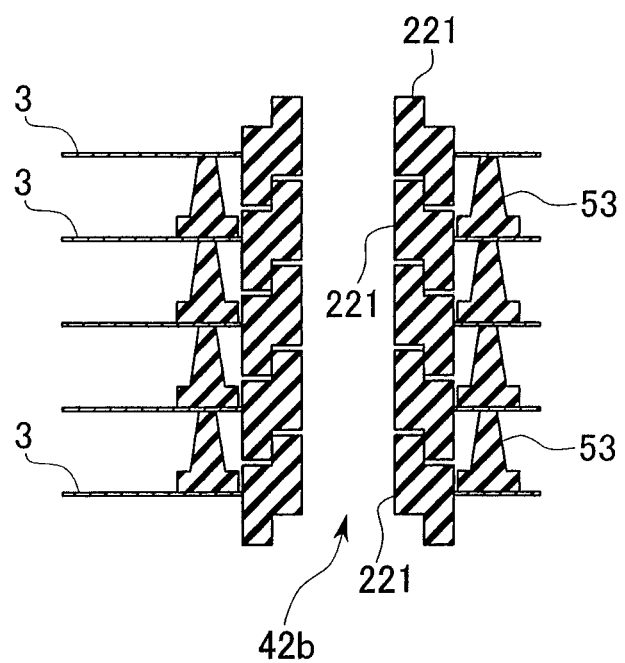
FIG. 13 is a cross-section showing the main parts of another modification example in the fourth embodiment.

FIG. 12 and FIG. 13 are cross-sections showing modification examples of the fifth embodiment.

In the description of this modification example below, the same constituents as those of FIG. 2 are denoted by the same reference symbols as in FIG. 2, and description thereof is omitted.

In the modification example of FIG. 12, an annular insulating member 211 comprising the same material and having the same sectional shape, for example, as that of the picture frame-shaped member 101 in FIG. 5, is arranged around each communication hole 41a, 42a, 43a, 41b, 42b, and 43b. In the modification example of FIG. 13, an annular insulating member 221 comprising the same material and having the same sectional shape, for example, as that of the picture frame-shaped member 111 in FIG. 6, is arranged around each communication hole 41a, 42a, 43a, 41b, 42b, and 43b.

According to these constructions, as with the construction in FIG. 11, a liquid connection by the cooling medium and an electrical short circuiting between adjacent separators in the reactant gas channel, intrusion of foreign substance at the time of enlargement of the space between separators, a deterioration of sealability with deterioration of the sealing material with the lapse of time, and a decrease in the seal surface pressure can be prevented.

Particularly, in the modification example in FIG. 13, all the insulating members 221 arranged around the respective communication holes 41a, 42a, 43a, 41b, 42b, and 43b have the same sectional shape. Therefore, when the insulating member 221 is integrally formed with the separator 3 by injection molding, molding is possible with only one kind of mold, thereby enabling a reduction is production cost.

Figure 14:
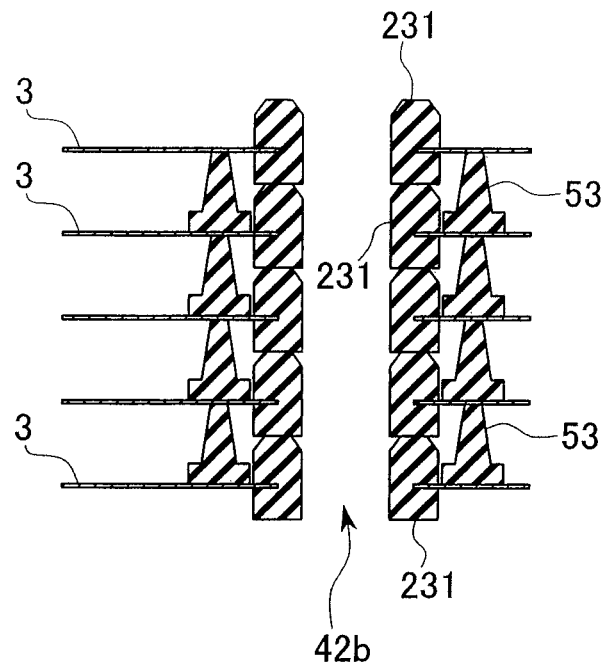
FIG. 14 is a cross-section showing the main parts of a fifth embodiment of the present invention.
Figure 15:
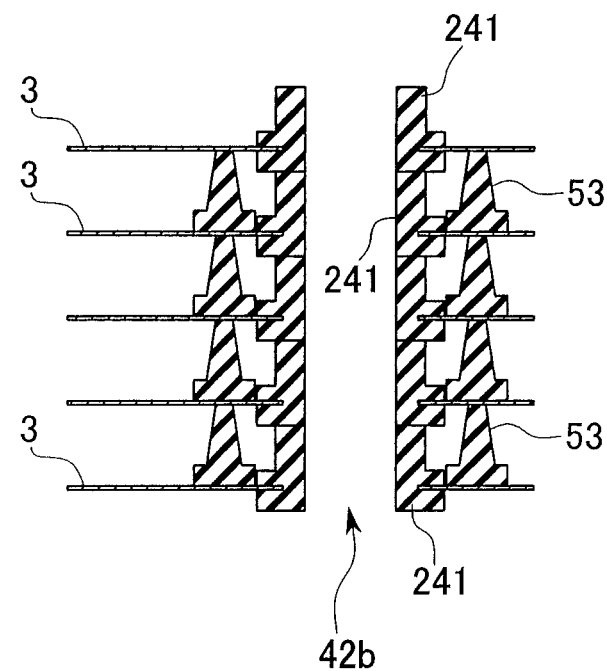
FIG. 15 is a cross-section showing the main parts of a modification example of the fifth embodiment.

FIG. 14 and FIG. 15 are cross-sections showing other modification examples of the fifth embodiment.

In the description of this modification example below, the same constituents as those of FIG. 2 are denoted by the same reference symbols as in FIG. 2, and description thereof is omitted.

In the modification example of FIG. 14, an annular insulating member 231 comprising the same material and having the same sectional shape, for example, as that of the picture frame-shaped member 61 in FIG. 2, is arranged around each communication hole 41a, 42a, 43a, 41b, 42b, and 43b. In the modification example of FIG. 15, an annular insulating member 241 comprising the same material, for example, as that of the flexible absorbing 61b in FIG. 2, and having a guard portion 241a at one of the open ends is arranged around each communication hole 41a, 42a, 43a, 41b, 42b, and 43b.

Also according to these construction, as with the construction in FIG. 11, a liquid connection by the cooling medium and an electrical short circuiting between adjacent separators in the reactant gas channel, intrusion of foreign substance at the time of enlargement of the space between separators, a deterioration of sealability with deterioration of the sealing material with the lapse of time, and a decrease in the seal surface pressure can be prevented. Further, the production cost at the time of integrally forming the insulating members 231 and 241 with the separator 3 by injection molding can be reduced.

A fuel cell according to a sixth embodiment of the present invention will now be described.

FIG. 19A is a cross-section showing the main parts of the fuel cell, and FIG. 19B is a enlarged diagram of a protruding portion of the peripheral sealing material 52a.

In this embodiment, the same constituents as those of FIG. 2 are denoted by the same reference symbols as in FIG. 2, and description thereof is omitted.

In this fuel cell, both surfaces of the outside portion of the peripheral sealing material 52, that is the front and rear surfaces of the outside portion is totally covered by the insulating material 271. In addition, the outer peripheral end surface of the separator 3 and the inner peripheral end surfaces of respective communication holes 41a, 42a, 43a, 41b, 42b, and 43a are also covered by the insulating member 271.

This insulating member 271 is made of elastic and elastic foam material such as rubber and the like, similar to the flexible absorbing portion 61b.

Furthermore, the insulating member 271 is integrally constructed with the first sealing material 51 including peripheral sealing material 52 and is also integrally constructed with the second sealing material 53.

The flat portion 52b (the flat portion of the insulating member 271b) of the peripheral sealing material at one side of the adjacent separator 3 is formed in flat, and the protruded portion 52a 8 the protruded portion of the insulating member 271a) of the peripheral sealing material at another side of the adjacent separator is formed in protruded. Furthermore, the top portion of the protruded portion of the peripheral sealing material is configured to be semicircular section.

The peripheral portion of the separator 3 and the inner peripheral portion of respective communication holes 41a, 42a, 43a, 41b, 42b, and 43b comprise step portions 3d, respectively. The peripheral portions 3a of the separator 3 and the inner peripheral portions of respective communication holes 41a, 42a, 43a, 41b, 42b, and 43b are converted to be the reaction surface 3A by these step portions 3d. A space 273 is provided between the reaction surfaces 3A of the separator 3.

According to this construction, it is possible to effectively avoided the electrical short circuiting between peripheral end portions of the separator 3 and between the inner peripheral end surfaces of respective communication holes 41a, 42a, 43a, 41b, 42b, and 43a.

In addition, since both surfaces of the exposed metal surface of the separator 3 at the peripheral sealing material 52 are totally covered by the insulating member 271, it is possible to improve the corrosion resistance of the separators and to prevent the electrical short circuiting between separators 3.

Furthermore, since the insulating member 271 is integrally constructed with the first sealing material 51 and the second sealing material 53, these insulating materials can be formed simultaneously, and thereby the production cost can be reduced.

Since the peripheral sealing materials 52 are formed in combination of a flat shape and a protruded shape, it is possible to absorb the relative misalignment of the protruded peripheral material with respect to the flat peripheral material, which thereby makes it unnecessary to conduct an alignment operation for peripheral sealing materials 52.

In addition, at the time of stacking the separators, the flat portion 52b of the peripheral sealing material is pressed by the semicircular top portion of the protruded peripheral sealing material 52a, it is possible to enhance the sealing between these peripheral portions.

In addition, since step portions 3d provided at the outer edge portions 3d of the separators 3 made of thin metal plates and provided around the communication holes function as a reinforcing rib, deformation of the separators 3 can be effectively prevented.

Since the protruded height of the step portion from front and rear surfaces of the adjacent separators 3 are set so as not to close the passage to the reaction surfaces 3A, that is, so as to form a space 273, the increase and decrease between adjacent separators 3 can be absorbed by the increase and decrease of the space 273.

Accordingly, it is possible to prevent extraneous materials from entering into the space when it is expanded, deterioration of the sealing material due to elapse of time, and reduction of the sealing surface pressure.

Figure 16:
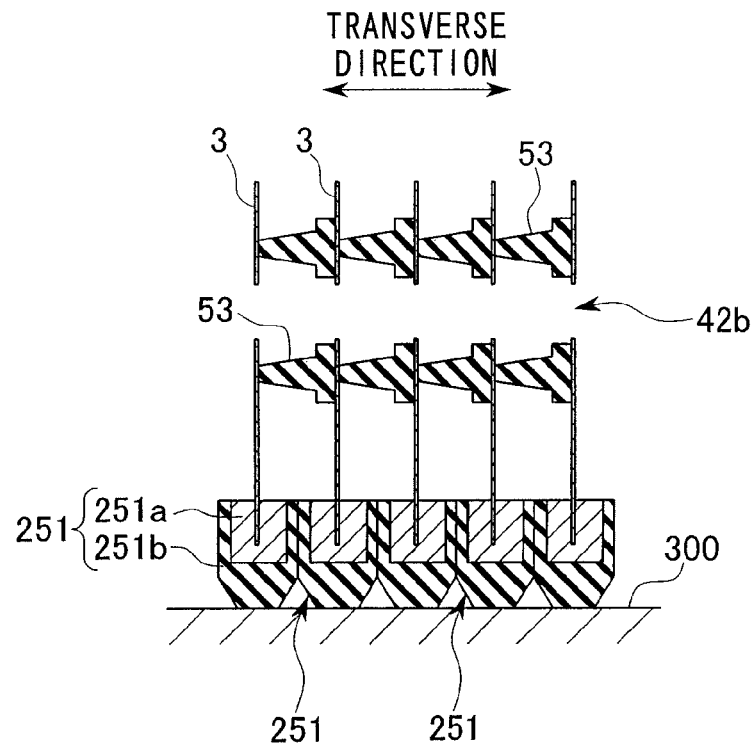
FIG. 16 is a cross-section showing the main parts of a sixth embodiment of the present invention.

FIG. 16 is a cross-section showing a sixth embodiment.

In the description of this modification example below, the same constituents as those of FIG. 2 are denoted by the same reference symbols as in FIG. 2, and description thereof is omitted.

A picture frame-shaped member 251 according to this embodiment is constructed such that the outer periphery of a body portion 251a arranged at the outer peripheral portion of the separator 3 is covered with a flexible absorbing portion 251b comprising a vibration isolating material such as rubber, so that the flexible absorbing portion 251b has also a function as a mounting portion to a vehicle body.

Also according to this construction, as with the construction in FIG. 1, intrusion of foreign substance at the time of enlargement of the space between separators and a deterioration of sealability with deterioration of the sealing material with the lapse of time can be prevented.

Moreover, in the case where the fuel cells 1 are stacked [stackd] in the lateral direction (in the horizontal direction) and mounted on a clamp face 300, the flexible absorbing portion 251b of the picture frame-shaped member 251 comes in contact with the clamp face 300 of the fuel cell 1, to also have a vibration isolating function. Hence, it is not necessary to mount the vibration isolating part to the fuel cell stack as a separate body, thereby enabling a cost reduction.

The flexible absorbing portion 251b comprising the vibration isolating material may be provided for each fuel cell or for a plurality of fuel cells as a unit.

Figure 17:
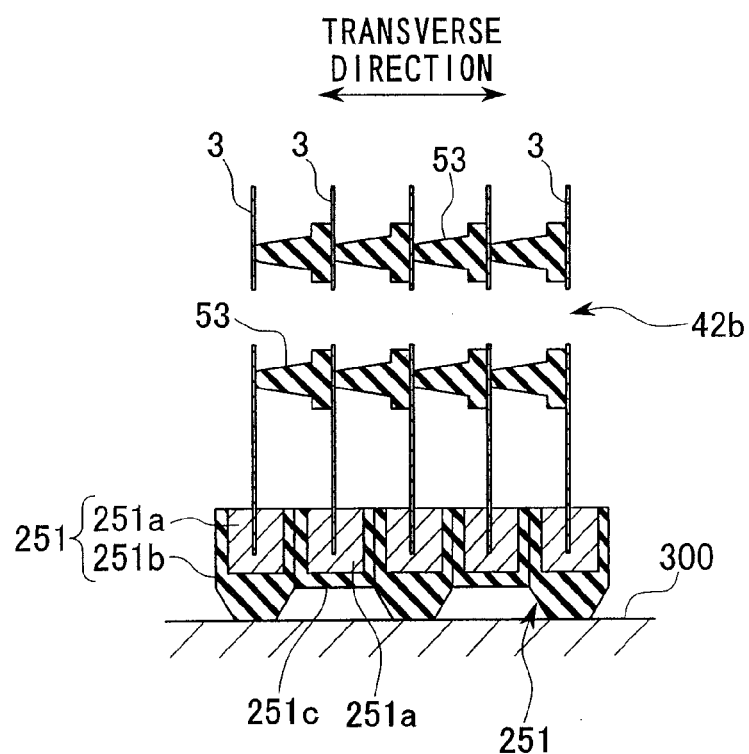
FIG. 17 is a cross-section showing the main parts of a modification example of the sixth embodiment.

A modification example shown in FIG. 17 shows a fuel cell stack in which one flexible absorbing portion 251b comprising the vibration isolating material is provided for each fuel cell. In this fuel cell stack, the flexible absorbing portion 251b comprising the vibration isolating material and a flexible absorbing portion 251c comprising the same material as that of the flexible absorbing portion 61b in FIG. 2 are alternately arranged for every other separator 3.

In the above described embodiments and modification examples, the separator 3 is formed of a stainless steel, but it may be formed of an other metal material such as titanium or a carbonaceous material.

As will be apparent from the above description, according to the present invention, the following effects can be obtained.

(1) According to the first aspect of the present invention, with respect to a movement enlarging the space between separators, a gap is not formed between the separator and the picture frame-shaped member, and further, with respect to a movement narrowing the space between separators, this movement is not restricted by the picture frame-shaped member. As a result, intrusion of foreign substance at the time of enlargement of the space between separators and insufficient sealing with deterioration of the sealing material with the lapse of time can be effectively prevented, and excellent power generation performance can be maintained.

(2) According to the second aspect of the present invention, the wideness or narrowness of the space between separators can be mechanically absorbed by relative sliding movement of the picture frame-shaped members. As a result, intrusion of foreign substance at the time of enlargement of the space between separators and insufficient sealing with deterioration of the sealing material with the lapse of time can also be effectively prevented, and excellent power generation performance can be maintained.

(3) According to the third aspect of the present invention, since the elastic member is capable of resiliently contracting in the stacking direction of the separators, relative approach of the separators is not restricted. With respect to an enlargement of the space between separators, the elastic member is resiliently restored and extends in the stacking direction of the separators, and follows the separator. As a result, intrusion of foreign substance at the time of enlargement of the space between separators and insufficient sealing with deterioration of the sealing material with the lapse of time can also be effectively prevented, and excellent power generation performance can be maintained.

(4) According to the fourth aspect of the present invention, registration of separators is automatically performed at the time of stacking the separators, and hence workability at the time of assembly and maintenance can be improved.

(5) According to the invention of claim 5, it is possible to prevent an electrical short circuiting between adjacent separators, and thereby good power generation performance of the fuel cell stack can be maintained (6) According to the sixth aspect of the present invention, it is possible to improve the corrosion resistance of separators and to prevent the electric short circuiting between adjacent separators, and thereby make it possible to maintain the good power generation performance.

(7) According to the seventh aspect of the present invention, it is possible to improve the corrosion resistance of separators and to prevent the electric short circuiting between separators, and thereby make it possible to maintain the good power generation performance.

(8) According to the eighth aspect of the present invention, since it is possible to absorb the misalignment of the protruded reaction surface peripheral sealing member with respect to the flat reaction surface peripheral sealing member, the productivity of the fuel cell stack can be improved.

(9) According to the ninth aspect of the present invention, not only in a single fuel cell, but also between the adjacent fuel cells, increase and decrease of the space between separators can be followed. As a result, intrusion of foreign substance at the time of enlargement of the space between separators and insufficient sealing with deterioration of the sealing material with the lapse of time can also be effectively prevented, and excellent power generation performance can be maintained.

(10) According to the tenth aspect of the present invention, since it is possible to effectively prevent the liquid connection by the cooling medium and an electrical short circuiting between adjacent separators, and hence excellent power generation can be maintained more reliably.

(11) According to the eleventh aspect of the present invention, it is possible to absorb increase and decrease of the spaces between separators, it is possible to effectively prevent intrusion of foreign substance at the time of enlargement of the space between separators, insufficient sealing with deterioration of the sealing material with the lapse of time, and reduction of sealing surface pressure.

(12) According to the twelfth aspect of the present invention, since the increase and decrease of the spaces between separators can be mechanically absorbed, it is possible to effectively prevent intrusion of foreign substance at the time of enlargement of the space between separators, insufficient sealing with deterioration of the sealing material with the lapse of time, and reduction of sealing surface pressure.

(13) According to the thirteenth aspect of the present invention, contraction of the spaces between separators can be followed because the elastic material can be contracted elastically in the stacking direction of the capacitors. The expansion of the spaces between separators, since the elastic material can elongate by elastic restoration, it is possible to effectively prevent intrusion of foreign substance at the time of enlargement of the space between separators, insufficient sealing with deterioration of the sealing material with the lapse of time, and reduction of sealing surface pressure.

(14) According to the fourteenth aspect of the present invention, it is possible to effectively prevent the electrical short circuiting at the inner peripheral surfaces of respective communication holes of adjacent separators, and thereby the fuel cell is capable of good power generating performance.

(15) According to the fifteenth aspect of the present invention, it is possible to absorb the relative misalignment of one insulating members to the other insulating member by combining a flat member and a protruded member, and thereby increase the productivity of the fuel cell.

(16) According to the sixteenth aspect of the present invention, it is possible to absorb the relative misalignment of one insulating members to the other insulating member by combining a flat member and a protruded member, and thereby increase the productivity of the fuel cell.

(17) According to the seventeenth aspect of the present invention, since it is possible to improve the short circuiting between adjacent separators, the good power generation performance is maintained.

(18) According to the seventeenth aspect of the present invention, since it is possible to integrally construct the reaction surface peripheral sealing member and the insulating member at the same time, and thereby the production cost can be reduced

(19) According to the nineteenth aspect of the present invention, it is possible to improve the corrosion resistance of separators, and it is also possible to effectively prevent short circuiting between adjacent separators. Thus, it is possible to maintain the good generating performance.

What is claimed is:

1. A fuel cell stack formed by stacking a plurality of fuel cells comprising:
   a first fuel cell; and
   a second fuel cell adjacent to the first fuel cell,
   wherein each of the first fuel cell and the second fuel cell includes:
      an electrode membrane assembly formed by a pair of electrodes sandwiching a solid polymer electrolyte membrane,
      a first separator and a second separator sandwiching outsides of the pair of electrodes, wherein each separator includes a plurality of communication holes, the plurality of communication holes including reactant gas communication holes and cooling medium communication holes, and
      insulating members provided around the plurality of communication holes;
   wherein a first space is formed between the insulating members formed on the first separator and the insulating members formed on the second separator, or
   wherein a second space is formed between the insulating members formed on the first separator of the first fuel cell and the insulating members formed on the second separator of the second fuel cell adjacent to the first separator of the first fuel cell, when the first fuel cell and the second fuel cell are stacked in a stacking direction.

2. A fuel cell stack according to claim 1, wherein the insulating members of the first separator of the first fuel cell and the insulating members of the second separator of the second fuel cell are formed such that the first separator of the first fuel cell and the second separator of the second fuel cell are capable of relatively sliding so as to allow increase and decrease of the second space while said insulating members are sealing the second space.

3. A fuel cell stack according to claim 2, wherein said insulating members are made of an elastic material.

4. A fuel cell stack according to claim 3, wherein inner peripheral surfaces of the plurality of communication holes are covered by the insulating members.

5. A fuel cell stack according to claim 4, wherein one of the insulating members of the first separator of the first fuel cell is formed in a flat shape, and another one of the insulating members of the second separator of the second fuel cell facing to said one of the flat insulating member is formed in a protruded shape.

6. A fuel cell stack according to claim 5, wherein each separator further includes a reaction surface, the fuel cell stack further comprising:

reaction surface peripheral sealing members surrounding the reaction surfaces of said first and second separators, wherein one of the reaction surface peripheral sealing members of the first separator of the first fuel cell is formed in a flat shape, while another one of the reaction surface peripheral sealing members of the second separator of the second fuel cell facing said flat reaction surface peripheral member is formed in a protruded shape.

7. A fuel cell stack according to claim 6, wherein one of the insulating members formed on the first separator of the first fuel cell or one of the insulating members formed on the second separator of the second fuel cell extends to entirely cover an outside portion of said reaction surface peripheral sealing member of the first separator of the first fuel cell or the second separator of the second fuel cell, respectively.

8. A fuel cell stack according to claim 7, wherein on the first separator of the first fuel cell or on the second separator of the second fuel cell, said reaction surface peripheral sealing member and said insulating member are integrally formed.

9. A fuel cell stack according to claim 8, wherein on the first separator of the first fuel cell or on the second separator of the second fuel cell, both outside surfaces of said reaction surface peripheral sealing member are entirely covered by the insulating member which is integrally formed with said reaction surface peripheral sealing member.

* * * * *